United States Patent
Andrus et al.

(10) Patent No.: US 6,993,334 B2
(45) Date of Patent: Jan. 31, 2006

(54) IDLE HANDOFF WITH NEIGHBOR LIST CHANNEL REPLACEMENT

(75) Inventors: Don N. Andrus, Encinitas, CA (US); Arthur J. Neufeld, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 356 days.

(21) Appl. No.: 10/137,044

(22) Filed: Apr. 30, 2002

(65) Prior Publication Data

US 2003/0203735 A1    Oct. 30, 2003

(51) Int. Cl.
*H04Q 7/20*    (2006.01)
(52) U.S. Cl. .................. 455/437; 455/452.2; 455/436; 455/450
(58) Field of Classification Search ................ 455/437, 455/436, 438, 439, 442–444, 450, 452.1, 455/452.2, 434, 455, 509, 513, 514, 516, 455/67.11, 226.2, 41.1–41.2; 370/331, 332, 370/333
See application file for complete search history.

(56) References Cited

U.S. PATENT DOCUMENTS

| | | | | |
|---|---|---|---|---|
| 5,678,184 | A | * | 10/1997 | Cutler et al. ................. 455/436 |
| 5,953,320 | A | | 9/1999 | Williamson et al. ......... 370/252 |
| 6,119,005 | A | * | 9/2000 | Smolik ......................... 455/436 |
| 6,505,043 | B1 | * | 1/2003 | Aihara ......................... 455/436 |
| 2002/0077104 | A1 | * | 6/2002 | Chen et al. .................. 455/436 |

FOREIGN PATENT DOCUMENTS

EP    0530165    3/1993

OTHER PUBLICATIONS

"TIA/EIA-95-B; Mobile Station-Base Station Compatibility Standard for Wideband Spread Spectrum Cellular Systems" TIA/EIA Standard, Feb. 3, 1995, pp. 6-164-6-167.
3GPP2 C.S0005-B Version 1.0; Upper Level (Layer 3) Signaling Standard for cdma2000 Spread Sprectrum Systems Release B 3rd Generation Partnership Project 2 "3GP2", Apr. 19, 2002, pp. 2-76-2-88.

* cited by examiner

*Primary Examiner*—Eliseo Ramos-Feliciano
(74) *Attorney, Agent, or Firm*—Philip R. Wadsworth; Charles D. Brown; Timothy F. Loomis

(57) ABSTRACT

Techniques for avoiding handoff to a channel impaired due to frequency dependent fading, while minimizing idle mode signaling are disclosed. In one aspect, an access terminal determines the assigned channel on an access point and caches the channel. In another aspect, the access terminal replaces a default channel associated with an access point in a cache with the assigned channel. In yet another aspect, the access terminal uses the cached channel associated with an access point when measuring channel quality of neighbor access points for use in handoff determination. In yet another aspect, the access terminal hands off to the cached channel of a neighbor access point during handoff. Various other aspects are also presented. These aspects have the benefit of factoring in frequency dependent channel characteristics when making handoff decisions, thus avoiding handoff to an access point where the assigned channel may be impaired.

11 Claims, 4 Drawing Sheets

IDLE HANDOFF WITH NEIGHBOR LIST CHANNEL REPLACEMENT

FIELD

The present invention relates generally to communications, and more specifically to a novel and improved method and apparatus for idle handoff with neighbor list channel replacement.

BACKGROUND

Wireless communication systems are widely deployed to provide various types of communication such as voice and data. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards. Non-CDMA systems include the AMPS and GSM systems.

A CDMA system may be deployed in a portion of spectrum that is divided into multiple channels. Base stations, or access points, within the system may support communication on one or more channels. When a mobile station, or access terminal, locates an access point, it can monitor broadcast information relevant to that access point. An access point may broadcast a list of channels that it supports. Procedures are known whereby an access terminal selects one of the supported channels of an access point with which to communicate. One example is for the access terminal to use a hash function, with the number of channels supported and an access terminal identifier, such as the International Mobile Subscriber Identification (IMSI), as inputs to the hash function. Such procedures allow the access terminals, many of which will be in idle mode, to be distributed evenly, on average, over the access point's available channels.

On occasion, perhaps as an access terminal travels throughout a system, it may be desirable to handoff to a neighboring access point. To facilitate handoff, an access point may broadcast a list of neighboring access points, known as the neighbor list. The neighbor list may contain, along with each access point, a channel supported by that access point. Thus, an access terminal can monitor the received signal strength of the access point it is currently communicating with (whether in the idle state or the traffic state), as well as the received signal strengths of one or more neighboring access points, as directed by the neighbor list. An access terminal can hand off to a neighbor based on the relative strength of the received signals. In some systems, an access terminal will require that a neighboring access point's signal exceed a threshold before handing off to that access point, to minimize repeated handoffs back and forth between two access points due to minor fluctuations in relative received signal strength.

One access point may support a set of channels that is different from the set of channels supported by a neighboring access point. In general, it is desirable to reserve as much of the capacity of a CDMA system for voice or data communication, by minimizing the amount of capacity used for non-traffic signaling. Therefore, the neighbor list is transmitted with a single channel supported for each neighbor, rather than the complete list of supported channels. An access terminal, when handing off to a new access point, monitors the broadcast of supported channels on the new access point, and then determines the appropriate supported channel, or assigned channel, on which to communicate. For example, the hash function described earlier can be used.

While certain conditions may cause uniform interference to signals received from an access point, some interference is frequency dependent. Therefore, while the received signal strength in the channel associated with a neighboring access point in the neighbor list may be suitable for a handoff, the received signal strength of the channel with which the access terminal will ultimately communicate may be unsuitable due to frequency dependent fading. In such a situation, an access terminal may hand off from a first access point to a second access point included in the neighbor list, determine the proper channel on which to communicate, determine that the channel is not sufficient, and thus return to the first access point (or perhaps a third access point). If the conditions have not changed significantly, the access terminal will make the same handoff decision as before, only to find the appropriate channel on the second access point is still unsuitable. Until conditions change, the access terminal may be caught in an endless loop, cycling from one access point to another and back again. Applying a threshold as described above, during such a frequency dependent fade, will not prevent the loop from forming. There is therefore a need in the art for avoiding handoff to a channel impaired due to frequency dependent fading, while minimizing idle mode signaling.

SUMMARY

Embodiments disclosed herein address the need for avoiding handoff to a channel impaired due to frequency dependent fading, while minimizing idle mode signaling. In one aspect, an access terminal determines the assigned channel on an access point and caches the assigned channel. In another aspect, the access terminal replaces a default channel associated with an access point in a cache with the assigned channel. In yet another aspect, the access terminal uses the cached channel associated with a neighbor access point when measuring channel quality of neighbor access points for use in handoff determination. In yet another aspect, the access terminal hands off to the cached channel of a neighbor access point during handoff. Various other aspects are also presented. These aspects have the benefit of factoring in frequency dependent channel characteristics when making handoff decisions, thus avoiding handoff to an access point where the assigned channel may be impaired.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
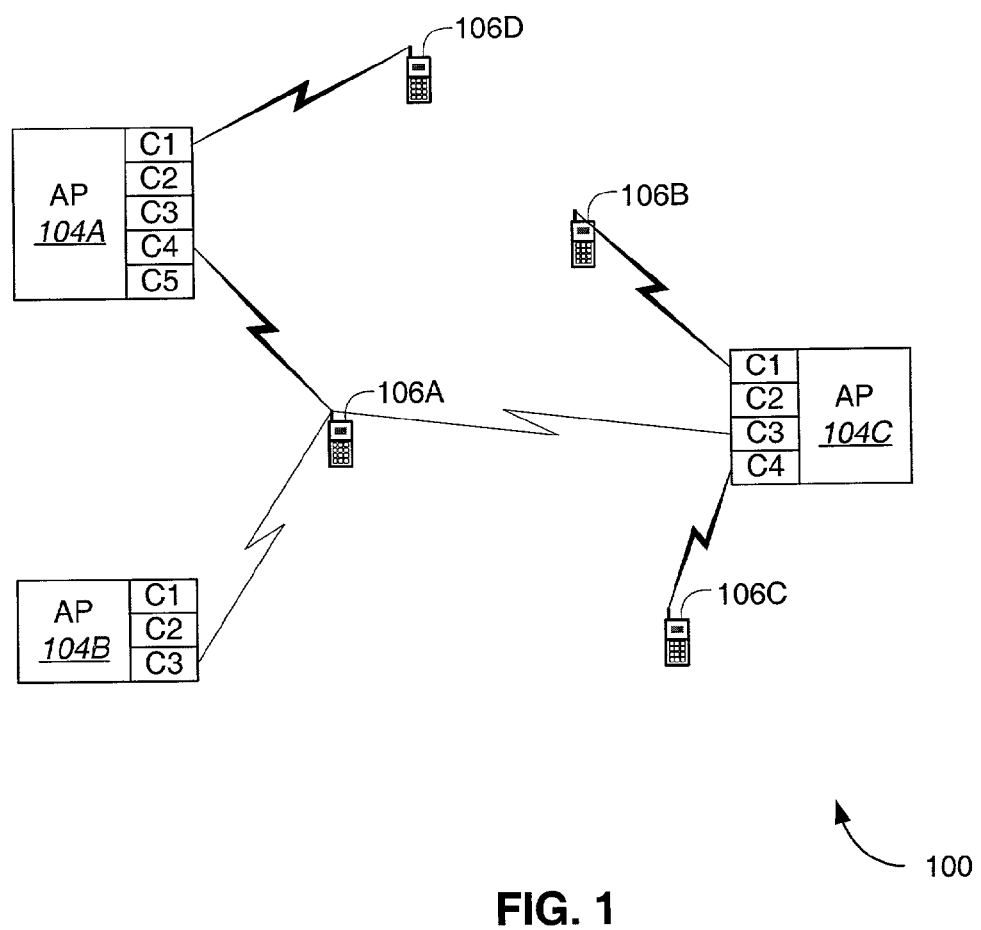
FIG. 1 is a general block diagram of a wireless communication system capable of supporting a number of users.

FIG. 1 is a diagram of a wireless communication system 100 that may be designed to support one or more CDMA standards and/or designs (e.g., the W-CDMA standard, the IS-95 standard, the cdma2000 standard, the HDR specification). In an alternative embodiment, system 100 may deploy any wireless standard or design other than a CDMA system. For simplicity, system 100 is shown to include three access points 104 in communication with four access terminals 106. The access point and its coverage area are often collectively referred to as a "cell". In IS-95 systems, a cell may include one or more sectors. In the W-CDMA specification, each sector of an access point and the sector's coverage area is referred to as a cell. As used herein, the term access point can be used interchangeably with the terms base station or NodeB. The term access terminal can be used interchangeably with the terms user equipment (UE), subscriber unit, subscriber station, mobile station, remote terminal, or other corresponding terms known in the art. The term mobile station encompasses fixed wireless applications.

Depending on the CDMA system being implemented, each access terminal 106 may communicate with one (or possibly more) access points 104 on the forward link at any given moment, and may communicate with one or more access points on the reverse link depending on whether or not the access terminal is in soft handoff. The forward link (i.e., downlink) refers to transmission from the access point to the access terminal, and the reverse link (i.e., uplink) refers to transmission from the access terminal to the access point. The communication links shown between access points 104 and access terminals 106 may include direct paths as well as paths introduced due to reflections off various obstacles (not shown).

For clarity, the examples used in describing this invention may assume access points as the originator of signals and access terminals as receivers and acquirers of those signals, i.e. signals on the forward link. Those skilled in the art will understand that access terminals as well as access points can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

Access points 104 may support communication on one or more channels, and neighboring access points need not support the same channels, or number of channels.

When an access terminal 106 is communicating with one or more access points 104, i.e., in the traffic state, the access terminal can monitor neighboring access points and feed back information such as channel quality and the like. Furthermore, the wireless communication system 100 can send messages tailored to each active access terminal, which can be used to direct the access terminal to hand off to a particular access point and can indicate which channel on that access point should be used. By contrast, when access terminals are not actively communicating with an access point, they can be said to be in idle mode. Various techniques for operating inactive access terminals, or those in idle mode, are disclosed in the aforementioned wireless communication standards, as well in alternative wireless communication systems.

It is common for systems to be designed such that access terminals in idle mode monitor the network with a minimum of signaling, to reserve system capacity for voice and data traffic. A mobile access terminal may handoff from one access point to another as it travels within a communication system, yet the access terminal need not transmit during this idle mode handoff process. An access terminal can monitor broadcast signals from the access points to identify access points whose signals are received with sufficient quality, such as an access point pilot signal. An access terminal can also monitor an access point to determine how many and which channels are supported by the access point. In addition, or alternatively, a system 100 can be deployed such that access points 104 broadcast additional information to aid access terminals 106 in determining which channels are supported and to locate neighboring access points.

An idle access terminal is said to be connected to an access point when it is tuned to and monitoring transmissions from the access point, regardless of whether or not the access terminal transmits to the access point. When in idle mode, soft handoff is often not employed, and an access terminal is connected to one channel of a single access point at a time. As channel conditions vary, due to any of a variety of factors including movement of the access terminal or variation of obstacles, an access terminal can determine a different access point to hand off to and connect with. A variety of criteria, such as relative channel quality, are known in the art, and can be used by an access terminal to determine when a handoff is appropriate and to determine a new access point with which to connect.

Many idle access terminals may be connected to an access point at any given time. Since it may not be known a priori which access terminals will go from idle to active, by initiating or receiving a voice or data call, it may be desirable to distribute the access terminals somewhat evenly over the channels supported by the access point. To reserve system capacity for active voice or data traffic, various techniques are known by which an access terminal can determine which particular channel on an access point to connect with without any access terminal specific signaling. In the exemplary embodiment, an access terminal hashes an identifier with the number of available channels on the access point to determine its assigned channel. For example the International Mobile Subscriber Identification (IMSI) can be used. The hashed values of the identifiers of various access terminals connected with an access point produce a distribution of assigned channels for the various access terminals.

In the exemplary embodiment, a system exhibiting features included in the IS-95 standard and its progeny is deployed. Those of skill in the art will recognize that the principles disclosed herein can be extended to a variety of alternate systems. In the exemplary embodiment, each access point broadcasts a list of neighboring access points, which may or may not be accessible to the access terminal. To reduce the size of the neighbor list broadcast, a single supported channel for each neighbor in the list is included in the broadcast. In the exemplary embodiment, the default channels included in the neighbor list broadcast can be unique for the channel on which it is broadcast. Thus, the default channel for a neighbor can be selected that is the most likely channel assigned to an access terminal monitoring that particular channel. For example, it may be that a majority of access terminals monitoring channel 4 of a 5-channel access point would, after handoff, be assigned to channel 3 of a neighboring 4-channel access point, with the remainder being assigned to channel 4. In this case, to maximize the number of access terminals that would handoff to their ultimate destination, it may be prudent to set the default channel for that neighbor to channel 3 in the neighbor list broadcast on channel 4. In this example, all of the access terminals monitoring channel 5 of the 5-channel access point would, after handoff, be assigned to channel 4 of the neighboring 4-channel access point, so the default channel for that neighbor would be set to 4 in the neighbor list broadcast on channel 5. If channel information for a neighbor is not known, any channel can be assigned as the default channel for that channel in the neighbor list broadcast on all the channels of an access point.

Alternate systems could include the complete list of supported channels for each access point, although this would require additional system resources for transmission. Each access point also broadcasts a list of channels supported by that access point. (In an alternative embodiment, either the neighbor list or channel list broadcast can be omitted, and access terminals could search for neighbor access points and/or supported channels. Those of skill in the art will recognize how to trade off using system resources to broadcast information to aid in neighbor searching with the search time and/or resources required by access terminals in idle mode handoff.)

In the exemplary embodiment, an access terminal in idle mode measures the channel quality of the access point with which it is connected, as well as periodically measuring the channel quality of neighboring access points. The channel measured on a neighbor access point will be the default channel associated with the neighbor as transmitted in the broadcast neighbor list from the connected access point, unless the assigned channel for that neighbor access point is known, as described hereinafter, in which case the assigned channel is measured. In the exemplary embodiment, the assigned channel for a neighbor access point will be known if the access terminal has previously connected with the access point, determined the assigned channel, and stored it (this technique will be detailed further below). According to the pre-determined criteria, an access terminal may hand off to one of the neighbor access points when the channel conditions so dictate, either on the default channel, or, if known, the assigned channel. The access terminal can then monitor the broadcast of the supported channel list, and therewith determine the assigned channel appropriate for the access terminal. For example, the number of channels hashed with the access terminal IMSI can be used to determine the assigned channel. If the assigned channel is different than the default channel, the access point can switch to the assigned channel for connection with the access point.

The assigned channel for an access point can also be stored for subsequent use, as just described (and detailed further below). This is beneficial when, for example, frequency dependent fading occurs such that the channel quality of the default channel is different than the channel quality of the assigned channel. If the default channel is significantly better than the assigned channel of a neighbor access point, and the access terminal measures the default channel in making a handoff determination, the access terminal may hand off to the neighbor access point, determine the assigned channel, switch to the assigned channel, and find that the channel quality is insufficient. The access terminal may then determine to hand off once more to the original access point, or an alternate neighbor access point. If the default channel is used again in handoff determination, the access terminal may decide to hand off once more to the access point only to find that, as before, the assigned channel is of insufficient quality. To avoid repeating this pattern continuously (or at least until channel conditions change), the access terminal can measure the quality of the assigned channel, to which it will ultimately connect, in determining the neighbor access point for handoff. Similarly, when the assigned channel is significantly better than the default channel, an access terminal can avoid ruling out a neighbor access point by measuring the assigned channel, which may be the best available channel among the neighbors, rather than measuring the default channel, which may be unsuitable for communication at the time.

FIG. 1 illustrates an example configuration of four access terminals 106A–106D and access points 104A–104C. Access points 104A is shown to include five channels, labeled C1–C5, respectively. Access point 104C is shown to include four channels, labeled C1–C4. Access point 104B is shown to include three channels, labeled C1–C3. Access terminal 106B is connected to access point 104C on channel C1. Access terminal 106C is also connected to access point 104C, but on channel C4. These channels were assigned due to differing resultant hash values of the access terminal identifiers (unique for each access terminal), and the number of channels supported by access point 104C (which is constant for all access terminals). Note that use of a hash function does not guarantee even distribution, but on average the distribution will tend to even out as the number of access terminals grows, assuming a random distribution of access terminal identifiers. In similar fashion, access terminals 106D and 106A are connected to access point 104A on channels C1 and C4, respectively. Note that any number of access points 104 and access terminals 106 can be deployed in any given system 100. Furthermore, the channels supported by each access point can be unique, and the sets of channels supported may or may not overlap.

In this illustration, access terminal 106A is connected to access point 104A on channel C4, indicated by a darker connection. Access point 104A broadcasts a neighbor list that includes access points 104B and 104C. The neighbor list broadcasted to the access terminals monitoring channel C4 includes default channels of C3 for both access points in the list (the default channel needn't be the same for all access points in the list). Furthermore, as stated above, if channel information of neighbors is not known, an arbitrary default channel, such as C1, may be assigned. In addition to measuring the quality of channel C4 on access point 104A, access terminal 106A measures the quality of channel C3 on access point 104B and channel C3 on access point 104C, indicated by a lighter connection. Any handoff determination will take these measured values into account. In this example, access terminal 106A has previously handed off to access point 104C and determined that its assigned channel on that access point is indeed C3, which happened to be the same as the default channel. Therefore, the measured channel quality for access point 104C will include the relevant frequency dependent characteristics.

The assigned channel on access point 104B has not yet been determined, so, if the assigned channel turns out to be different than the default channel, the measured channel quality for access point 104B will not include relevant frequency dependent characteristics. It is possible that access terminal 106A may hand off to access point 104B, determine the assigned channel, switch to it, and find a channel of insufficient quality. In this case, access terminal 106A can measure the appropriate channels on access points 104A and 104C, and a more reliable determination can be made for subsequent handoff. In this example, it turns out that the assigned channel for access terminal 106A on access point 104B is channel C2, so the measurements being made on channel C3 will not contain any relevant frequency dependent characteristics of the channel. It is also possible that access point 104B will transmit additional neighbors for which access terminal 106A only has the default channel. However, as access terminal 106A roams among access points it has previously visited, the frequency dependent channel characteristics can be taken into account, thus resulting in better handoff decisions. For example, the assigned channel for access point 104B, C2, can be stored to avoid the previously described situation in which access terminal 106A monitored the default channel, C3, on access point 104B.

Figure 2:
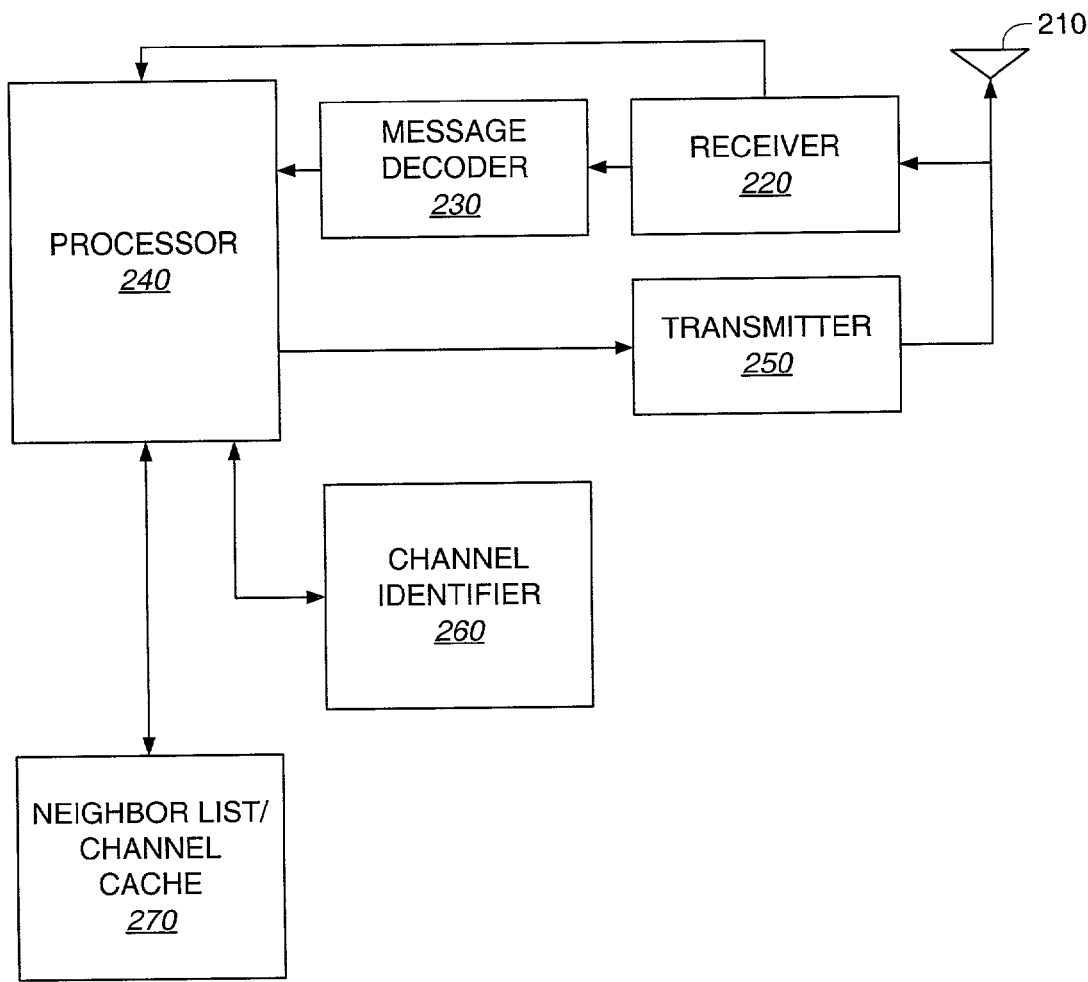
FIG. 2 depicts an exemplary embodiment of an access terminal equipped for neighbor list channel replacement.

FIG. 2 depicts a portion of an access terminal 106. Signals are received at antenna 210 and delivered to receiver 250. Receiver 220 performs processing according to one or more wireless system standards, such as the cellular standards listed above. Receiver 220 performs various processing such as Radio Frequency (RF) to baseband conversion, amplification, analog to digital conversion, filtering, demodulation, deinterleaving, decoding, and the like. Various techniques for receiving are known in the art. Data received may be transmitted to processor 240 for use in voice or data communications. Additional components for supporting voice communications or data applications are not shown.

Receiver 220 can communicate with an access point by tuning to the correct channel and demodulating according to the parameters associated with the access point. In a CDMA system, such as those described above, access points can be differentiated by demodulating with a scrambling sequence (typically a Pseudorandom Noise (PN) sequence) associated with the access point. Receiver 220 can also connect with a channel supported by an access point by tuning to the frequency of that channel. Receiver 220 may be used to measure channel quality of the currently connected channel, as well as channels on neighbor access points. Receiver 220 may be directed to periodically tune to an alternate frequency to measure the channel quality on an alternate frequency, returning to the previous frequency once the measurement is complete. In addition, receiver 220 can be programmed to monitor neighboring access points. In a CDMA system, the appropriate scrambling sequence is used to monitor channel quality of a neighbor access point. The channel quality measurements can be delivered to processor 240 for use in idle handoff determination. Alternately, some or all of the channel quality computations may be carrier out in processor 240.

Received data is also delivered to message decoder 230. Message decoder 230 decodes various messages used in setting up, maintaining and tearing down a call on a cellular network (or other wide area network). Among the messages that can be decoded are neighbor list or channel list messages, transmitted from an access point, as described above. Other messages for transmitting information for assisting in idle mode handoff can be decoded as well. Various messages are known in the art, examples of which are described in the aforementioned communication standards. The various messages are delivered to processor 240. Those of skill in the art will recognize that some or all of the procedures carried out in message decoder 230 and/or receiver 220 may be performed in processor 240.

Voice or data, as well as desired signaling, can be delivered to an access point via transmitter 250 through antenna 210. Data is delivered to transmitter 250 for formatting according to one or more communication standards supported by access point 106. Procedures in transmitter 250 may include vocoding, encoding, interleaving, modulation, filtering, amplification, digital to analog conversion, modulation, and the like. Data for use in voice communication or a data application may be delivered to transmitter 250 from processor 240, or from an alternate voice or data source (not shown). Signals generated in transmitter 220 are delivered for transmission on antenna 210. Those of skill in the art will recognize that some or all of the procedures carried out in transmitter 250 may be performed in processor 240.

Processor 240 may be a general purpose microprocessor, a digital signal processor (DSP), or a special purpose processor. Processor 240 may perform some or all of the functions of transmitter 250, message decoder 230, or receiver 220, and may be connected with special purpose hardware to assist in these tasks (details not shown). Data or voice applications may be external to access point 106, such as an externally connected laptop computer, may run on an additional processor within access point 106 (not shown), or may run on processor 240 itself. Processor 240 may have embedded memory, or be connected to a memory (not shown) for storing instructions to perform various procedures and methods, detailed further below.

Channel identifier 260 is used to determine the assigned channel for the access terminal 106 on any particular access point. Given channel information for an access point, channel identifier 260 can be used to compute the assigned channel. As described above, access points and supported channels can be determined by access terminal searching, access point signaling, or a combination of the two. In the exemplary embodiment, the channel information, specifically a list of channels supported, for an access point is broadcast by that access point. The list of channels supported can be decoded in message decoder 230. The assigned channel is determined by performing a hash function with an access terminal identifier, such as an IMSI, with the number of channels supported, as given in the broadcast list of channels. The result of the hash function determines which of the list of channels is the assigned channel for the access terminal. Although a standalone channel identifier 260 could be deployed, in the exemplary embodiment, the function of channel identifier 260 is carried out in processor 240.

Neighbor list/channel cache 270 is connected to processor 240. It may be part of a memory attached to processor 240, or in memory contained in processor 240. Neighbor list/channel cache 270 comprises a list of neighbor access points and an associated channel for each access point. Additional information for each item in the cache may also be stored to facilitate cache management. The neighbor list information can be transmitted to the access terminal, the access terminal can perform searching to determine the neighbor access points, or a combination of the two can be used. Similarly, the channel information can be transmitted, or the access terminal can search for available channels, or a combination of the two can be used. In the exemplary embodiment, the neighbor list/channel cache is filled using the neighbor list broadcast from an access point. The associated channel is initialized as the default channel transmitted. After the access terminal has connected to an access point, the assigned channel can be stored, overwriting the default channel, as described above, and in further detail below.

Figure 3:
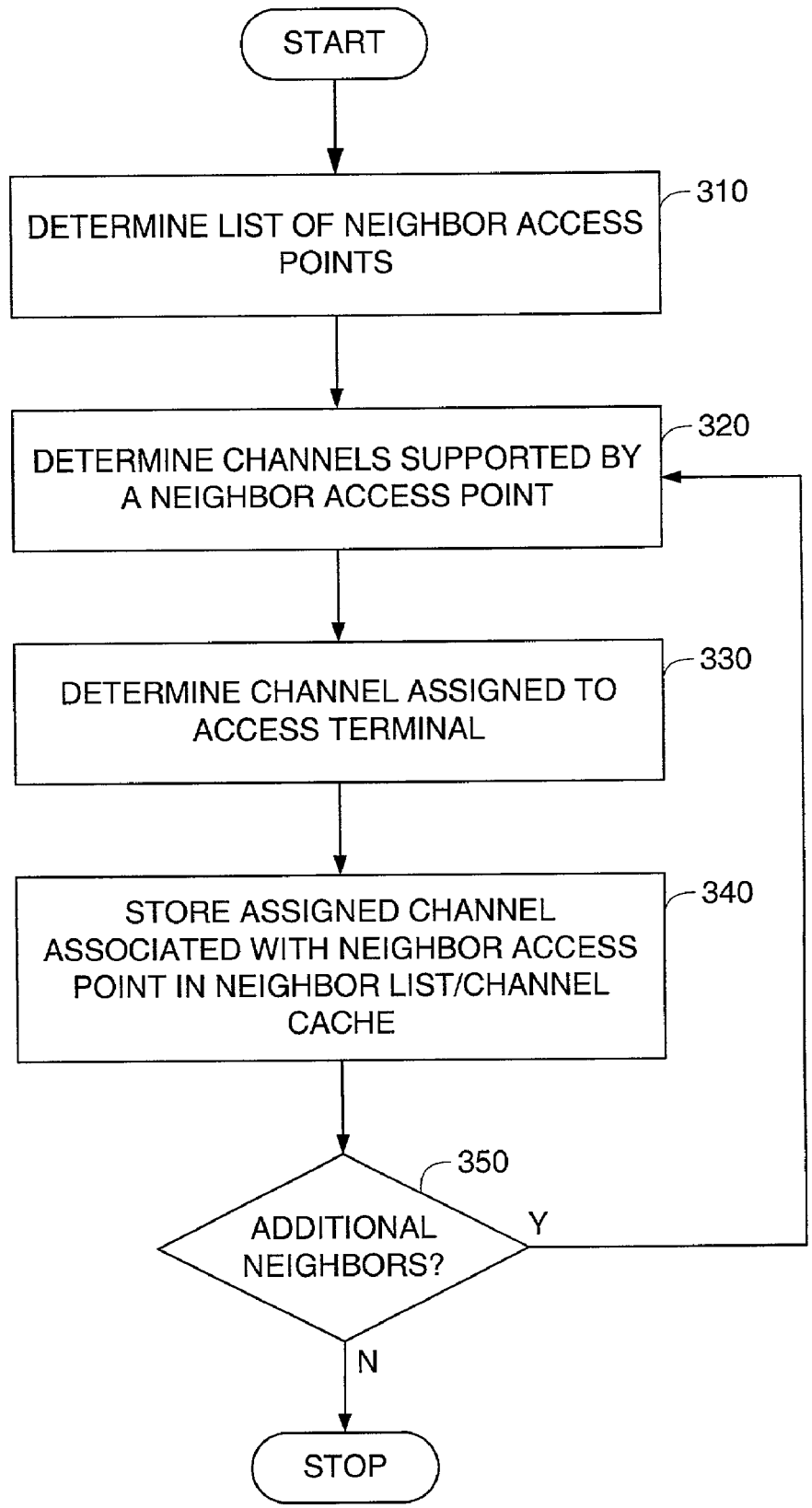
FIG. 3 is a flowchart of an embodiment of a method of neighbor list/channel caching.

FIG. 3 is a flowchart of an embodiment of a method of neighbor list/channel caching, which can be used in conjunction with idle mode handoff. The process starts in step 310, where a list of neighbor access points is determined. These can be determined by access terminal search, access point transmission, or a combination of both. In the exemplary embodiment, each access point broadcasts a neighbor list on each channel supported by the access point. Proceed to step 320. In step 320, determine the channels supported by a neighbor access point. This can be determined by access terminal search, access point transmission, or a combination of both. In the exemplary embodiment, an access terminal connects to a neighboring access point, and monitors a broadcast from the access point that includes the supported channels. Proceed to step 330.

In step 330, the assigned channel for the access terminal is determined. A variety of techniques for assigning access terminals to available channels are known in the art. In the exemplary embodiment, the access terminal generates a result from a function of the channels supported and an access terminal identifier. A hash function of the number of supported channels and the IMSI generates a number that identifies the assigned channel. Proceed to step 340.

In step 340, the assigned channel for the access point is stored in a neighbor list/channel cache, associated with the access point. Future channel quality measurements for or handoffs to this access point can then take advantage of the assigned channel stored in the cache, rather than relying on the default value. Proceed to decision block 350.

In decision block 350, if an additional neighbor remains for which an assigned channel is to be determined, proceed back to step 320 to repeat the process for the new neighbor. In the exemplary embodiment, this may occur when a new idle handoff is in order due to a change in channel conditions. When there are no additional neighbors to process, the process can stop. The process can be repeated as necessary.

Figure 4:
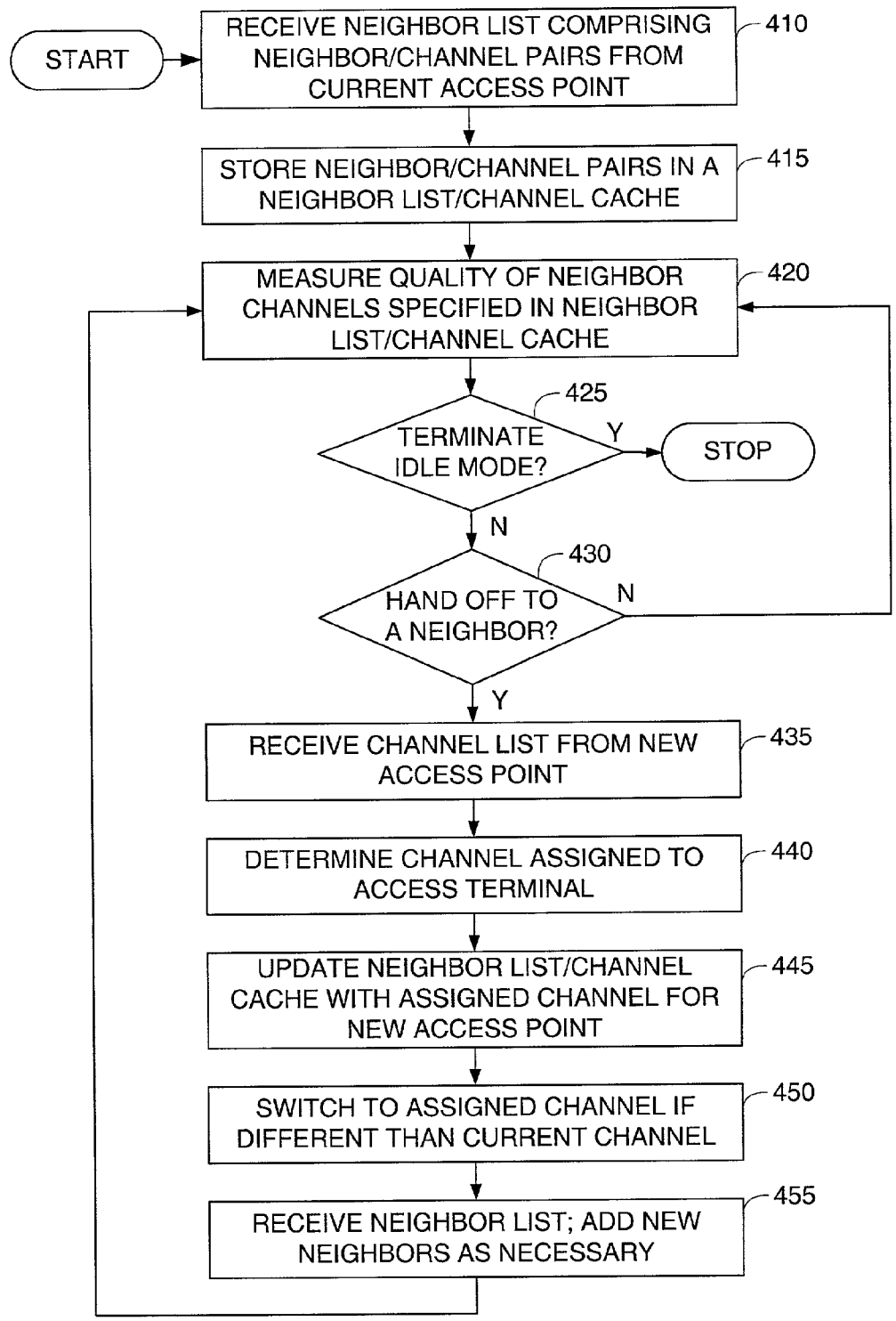
FIG. 4 depicts a flowchart of an embodiment of a method of idle handoff with neighbor list channel replacement.

FIG. 4 depicts a flowchart of an embodiment of a method of idle handoff with neighbor list channel replacement. The process begins in step 410. An access terminal receives a neighbor list comprising neighbor/channel pairs from the access point with which it is currently connected. Proceed to step 415. In step 415, the neighbor/channel pairs are stored in a neighbor list/channel cache. In this example, the cache is empty until it receives the first neighbor list. Subsequently, the cache can be updated by new neighbor lists, as transmitted by new access points, and cache entries can expire and be flushed, using caching techniques commonly known in the art. Proceed to step 420.

In step 420, the quality of neighbor access points is measured on the channel associated with each access point in the neighbor list/channel cache. Upon initialization, only the default channel for each access point will reside in the cache, but as the access terminal determines the assigned channel for access points, described below, the measured channels will more accurately reflect the quality of the channel to which the access terminal may hand off. Proceed to decision block 425.

In decision block 425, if idle mode is terminated, the process stops. Idle mode may be terminated if a voice or data call is initiated or received, or if the access terminal is powered off. The placement of decision block 425 in the flowchart is arbitrary, as idle mode may be terminated from any step in the process. Note further that the cached channel assignments can still be available if the process of FIG. 4 is repeated after idle mode has been terminated. If idle mode is to continue, proceed to decision block 430.

In decision block 430, a decision to hand off or not is made based on applying the measured quality of the current channel and those of neighboring access points to predetermined criteria. Various criteria for making handoff decisions are known in the art. If no handoff takes place, loop back to step 420 to continue monitoring relative channel qualities. If an idle mode handoff is indicated in decision block 430, proceed to step 435.

In step 435, after tuning to the new access point, on the channel indicated in the neighbor list/channel cache, the access terminal receives a broadcast of the channel list supported by the new access point. Implicit in the description of this step, and those following, is the possibility that a handoff to a neighbor access point proves to be unsuccessful, in that some or all of the channels are of insufficient quality, even if previous measurements indicated otherwise. In these situations, the access terminal may return to the prior access point, when a return-on-fail flag is set, for example. Or the process can return to step 420 to determine a suitable alternative access point. These alternate connections are not shown in FIG. 4. Proceed to step 440.

In step 440, the access terminal can determine the assigned channel with the channel list received. Methods for such determination are discussed above. In the exemplary embodiment, the access terminal IMSI is hashed with the number of channels, the result of the hash is used to select one channel from the channel list for the assigned channel. Note that it is possible that the default channel turns out to be the proper assigned channel. Furthermore, if the access terminal has previously connected with this new access point, the proper assigned channel may have been stored in the cache, and so again, the access terminal is already communicating on the proper channel. Proceed to step 445.

In step 445, the access terminal updates the neighbor list/channel cache with the assigned channel for the new access point, if necessary. As just mentioned, updating the cache is not necessary if the update has been made previously or if the default channel turns out to be the assigned channel. Or, the cache can simply be updated regardless, as there is little harm in rewriting a value in the cache with the same value. The benefit of simply updating is that no test needs to be made to determine whether an update is necessary. Furthermore, if the caching scheme saves time stamps of cache entries for determining if entries are stale, then updating causes the proper time stamp to be made. Proceed to step 450.

In step 450, the access terminal switches to the assigned channel, if different from the initial channel monitored from the new access point. If this is the first visit to the particular access point, and if frequency dependent fading has caused the assigned channel to be poor while the default channel was sufficient, the access terminal may find that communication on the assigned channel will fail. As described above, the access terminal may have a return-on-fail flag set that causes the access terminal to return to the access point from which it came prior to the handoff. Alternatively, the access terminal can monitor the channel quality of the neighbors and determine a new neighbor to hand off to by returning to step 420 for neighbor channel measurement (this alternate connection is not shown in FIG. 4). Even in the case where the assigned channel is insufficient for communication, the proper assigned channel is stored in the neighbor list/ channel cache so that, in the future, the proper channel will be measured and an erroneous handoff can be avoided.

It is also possible that the proper assigned channel was stored in the neighbor list/channel cache, and so the channel quality measurement for the new access point was accurate. In this case the handoff has reaped the benefit of replacing the default channel with the assigned channel in the cache, and a proper handoff decision has been made. Proceed to step 455.

In step 455, the access terminal can receive the neighbor list broadcast by the new access point. The new neighbor list may contain additional entries that may be added to the cache with their associated default channel. Neighbors in the list which are already represented will not have their associated channels overwritten, since it is possible that a previous iteration of this procedure has updated the cache with the proper assigned channel, and to overwrite with the default channel would eliminate the benefit of knowing and measuring the assigned channel. The process then returns to step 420 to continue monitoring the relative quality of the current channel and the channels of neighbor access points. When channel conditions change such that the pre-determined criteria of decision block 430 are met, a handoff will be made. The process can repeat indefinitely, or can be terminated at any time once idle mode is left, as discussed above.

It should be noted that in all the embodiments described above, method steps can be interchanged without departing from the scope of the invention. In various alternate embodiments one or more of steps 420–455 may occur in parallel.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An access terminal comprising:
a neighbor list identifier for determining a list of neighbor access points and default channels associated therewith;
a cache for storing a first default channel associated with a first neighbor access point on the list of neighbor access points;
an assigned channel identifier for determining a first assigned channel associated with the first neighbor access point and replacing the first default channel in the cache with the first assigned channel; and
a channel quality measurer for measuring channel quality of the first assigned stored channel prior to a handoff to the neighbor access point.

2. The access terminal of claim 1, further comprising a message decoder for receiving channel information messages from an access point, the channel information delivered to the assigned channel identifier for use in determining the assigned channel.

3. The access terminal of claim 1, wherein the assigned channel identifier comprises a hash function.

4. The access terminal of claim 1, further comprising a receiver for detecting a neighbor access point.

5. The access terminal of claim 1, further comprising a receiver for detecting channel information on a neighbor access point.

6. The access terminal of claim 1, wherein if the first neighbor access point appears on a later list of neighbor access points, the first default channel is not stored in place of the first assigned channel.

7. A wireless communication system, including an access terminal, comprising:
means for determining a list of one or more neighbor access points;

means for determining a first default channel associated with a first neighbor access point on the list of one or more neighbor access points;
means for storing the first default channel;
means for determining a first assigned channel for the first neighbor access point;
means for storing the first assigned channel in place of the default channel; and
means for measuring channel quality of the first assigned channel.

8. A method of idle handoff, comprising:
determining a list of one or more neighbor access points;
determining the channels supported by one neighbor access point of the list of neighbor access points a first default channel for a first neighbor access point from the list of one or more neighbor access points;
storing the first default channel;
determining a first assigned channel for the first neighbor access point;
storing the first assigned channel in place of the first default channel; and
measuring channel quality of the stored channel prior to an idle handoff to the stored channel of the neighbor access point.

9. The method of claim 8, further comprising handing off to the neighbor access point on the associated channel identified in the cache when the measured channel quality of the associated channel meets a pre-determined criteria.

10. An access terminal, comprising:
means for determining a list of one or more neighbor access points;
means for determining a first default channel associated with a first neighbor access point on the list of one or more neighbor access points;
means for storing the first default channel;
means for determining the channels supported by the first neighbor access point;
means for determining a first assigned channel associated with the first neighbor access point;
means for storing the first assigned channel in place of the default channel; and
means for measuring channel quality of the first assigned channel prior to an idle handoff to the first neighbor access point.

11. Processor readable media operable to perform the following steps:
determining a list of one or more neighbor access points;
determining a first default channel for a first neighbor access point from the list of one or more neighbor access points;
storing the first default channel;
determining a first assigned channel for the first neighbor access point;
storing the first assigned channel in place of the first default channel; and
measuring channel quality of the stored channel prior to an idle handoff to the stored channel of the neighbor access point.

* * * * *